(12) United States Patent
Hall

(10) Patent No.: US 7,482,945 B2
(45) Date of Patent: *Jan. 27, 2009

(54) APPARATUS FOR INTERFACING WITH A TRANSMISSION PATH

(76) Inventor: David R. Hall, 2185 S. Larsen Pkwy., Provo, UT (US) 84606

( * ) Notice: Subject to any disclaimer, the term of this patent is extended or adjusted under 35 U.S.C. 154(b) by 0 days.

This patent is subject to a terminal disclaimer.

(21) Appl. No.: 11/856,108

(22) Filed: Sep. 17, 2007

(65) Prior Publication Data
US 2008/0007424 A1  Jan. 10, 2008

Related U.S. Application Data

(62) Division of application No. 11/307,406, filed on Feb. 6, 2006, now Pat. No. 7,298,286.

(51) Int. Cl.
*G01V 3/00* (2006.01)

(52) U.S. Cl. ............ 340/854.3; 367/82; 439/191; 166/385; 340/854.4; 340/854.8

(58) Field of Classification Search ............ 340/854.3, 340/854.8; 367/82; 439/191; 166/385
See application file for complete search history.

(56) References Cited

U.S. PATENT DOCUMENTS 6,717,501 B2 * 4/2004 Hall et al. ............ 336/132
7,298,286 B2 * 11/2007 Hall ..................... 340/854.3

* cited by examiner

*Primary Examiner*—Albert K Wong
(74) *Attorney, Agent, or Firm*—Tyson J. Wilde

(57) ABSTRACT

A downhole communication apparatus has a signal coupler disposed in an end of a downhole tubular component. The signal coupler has a transceiver portion and a conductor portion. A data conductor integrated into the downhole tubular component is operably connected at a junction to the conductor portion of the signal coupler. A peripheral electronic device is in communication with the conductor portion of the signal coupler, either through an electrical coil wrapped around at least part of the conductor portion of the signal coupler or direct electrical contact with the conductor portion of the signal coupler.

15 Claims, 12 Drawing Sheets

APPARATUS FOR INTERFACING WITH A TRANSMISSION PATH

CROSS REFERENCE TO RELATED APPLICATIONS

This application is a divisional of U.S. patent application Ser. No. 11/307,406, which was filed Feb. 6, 2006, now U.S. Pat. No. 7,298,286 and is herein incorporated by reference for all that it discloses.

BACKGROUND OF THE INVENTION

The present invention relates to the field of communication along a drill string used for oil and gas exploration, and particularly to the area of interfacing with a network along a drill string. Communication with downhole tools while drilling has been sought for several decades. Several systems in the prior art have disclosed communication with downhole equipment, and for purposes of understanding they may be grouped into two categories: those that communicate along a wireline cable, and those that communicate through a tool string Examples of systems which communicate along a wireline cable may be found in U.S. Pat, No. 5,521,592 to Veneruso (the '592 patent) and U.S. Pat, No. 5,140,318 to Stiner (the '318 patent). The '592 patent discloses a method and apparatus for transmitting information, in which information picked up by at least one downhole sensor is conveyed to surface reception means via a wire connection electrically connecting said device to an electrical power supply means on the surface, said wire connection is inductively coupled firstly with said sensor and secondly with said reception means. The '318 patent discloses a data transmission system for use with a logging cable that functions to provide a more precise transmission of data signal with reduced interference from higher-powered electrical signals present along the line. The data signals are modulated on a radio frequency carrier, which is then inductively coupled to the cable jacket or shielding sheath for conduction along the cable.

Examples of systems that communicate through a tool string are disclosed in U.S. Pat. No. 6,679,332 to Vinegar (the '332 patent), and U.S. patent application Ser. No. 10/905,894 filed on Jan. 25, 2005 in the name of Hall et. al (The '894 application). The '332 patent discloses an electronic module that communicates with the surface using the tubing string and casing as conductors. Induction chokes at the surface and downhole electrically impede AC flow through the tubing with a resulting voltage potential useful for power and communication. The '894 application discloses a communication element electrically connected with a transmission path within a downhole component that inductively communicate with electronic equipment.

BRIEF SUMMARY OF THE INVENTION

A downhole communication apparatus comprises a downhole tubular component having a signal coupler disposed in an end thereof. The signal coupler has a transceiver portion and a conductor portion. A data conductor such as a coaxial cable is integrated into the tubular component and is operably connected at a junction to the conductor portion of the signal coupler. Multiple tubular components may be joined at the ends in a tool string and pass data through the tool string through a system of interconnected signal couplers and data conductors.

A peripheral electronic device is in communication with the conductor portion of the signal coupler, allowing the peripheral electronic device to transmit and/or receive data along the data conductor 23 in the tubular component. This communication is achieved in one embodiment through an electrical coil wrapped around at least part of the conductor portion of the signal coupler.

In another embodiment the peripheral electronic device comprises a direct electrical connection to a junction between the data coupler and the conductor portion of the signal coupler. The peripheral electronic device is preferably housed in a wall of the tubular component.

The peripheral electronic device may be a sensor or processing element that is designed to communicate with surface equipment through its connection to the tool string through the signal coupler. The peripheral electronic device may transmit a signal to the signal coupler on a carrier frequency distinct from a carrier frequency of separate data transmissions on the tool string.

DETAILED DESCRIPTION OF THE INVENTION AND THE PREFERRED EMBODIMENT

Figure 1:
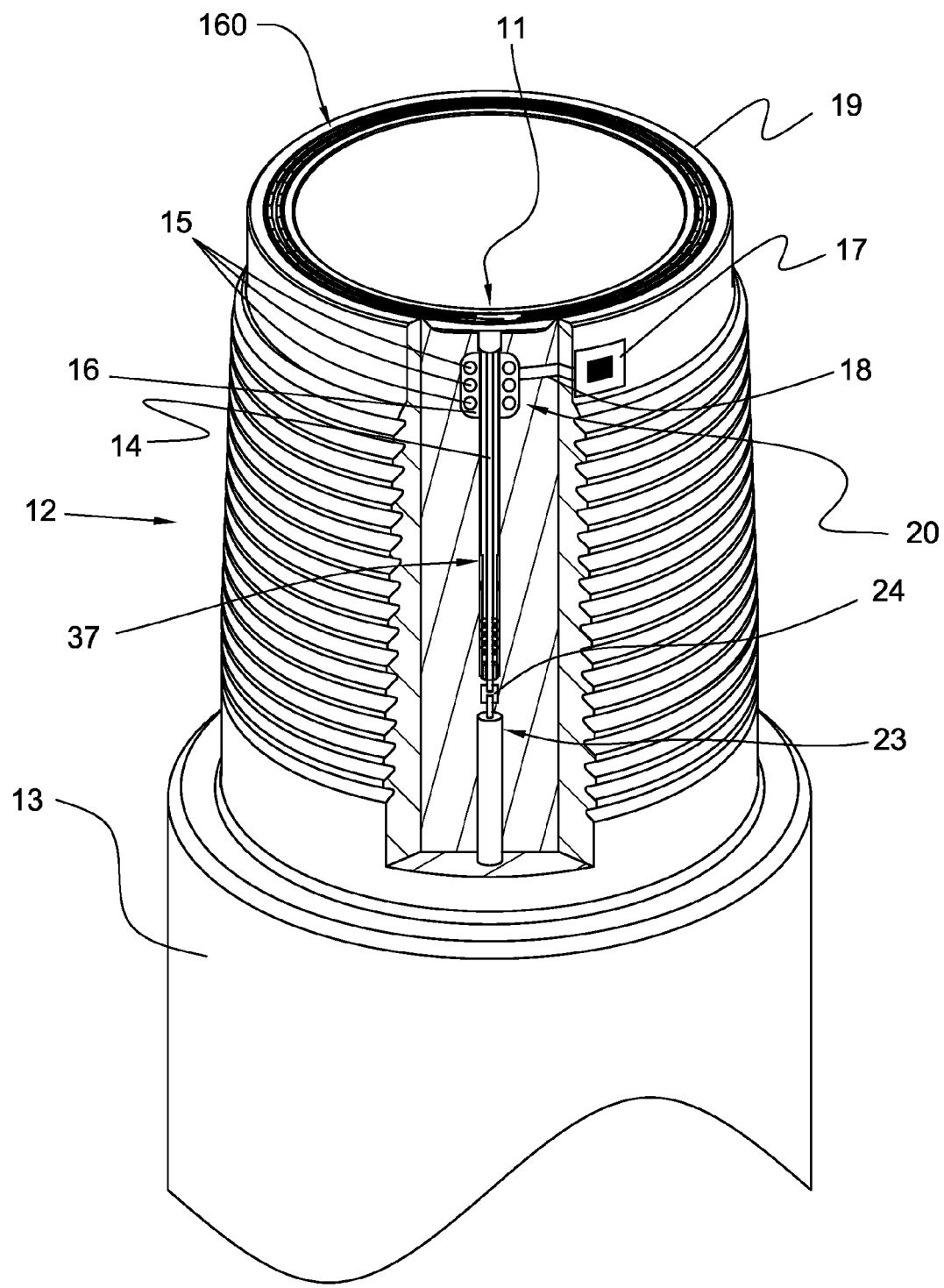
FIG. 1 is a cut-away diagram of a pin end of a downhole component.

FIG. 1 is a cut-away diagram of a pin end 12 of a downhole tubular component 13. A data transmission system is integrated into the downhole component 13. In general, the data transmission system may be adapted to transmit power signals, data signals, and packets. Examples of data transmission systems that may be compatible with the present invention include those disclosed in U.S. Pat. No. 6,670,880 to Hall, et al. U.S. Pat. No. 6,641,434 to Boyle, et al.; U.S. Pat. No. 6,866,306 to Boyle, et al.; and U.S. Pat. No. 6,688,396 to Floerke, et al., all of which are herein incorporated by reference for all that they disclose.

In the preferred embodiment the data transmission system is the data transmission system disclosed in the '880 patent or substantially similar to it and comprises at least one signal coupler 11 electrically connected to a data conductor 23. The signal coupler 11 comprises a transceiver portion 160 and a conductor portion 37. The transceiver portion 160 may communicate with a complementary signal coupler coupled to a box end in a second downhole tubular component such as will be later shown in FIG. 2. The conductor portion 37 of the signal coupler 11 may be operably connected at a junction 24 to the data conductor 23.

Still referring to FIG. 1, the conductor portion 37 of the signal coupler 11 may comprise wires, coaxial cables, connectors, lead-ins 14 or combinations thereof. A portion of the conductor portion 37 may be selectively removable, such as a lead-in 14 which may be removed for service or replacement.

The signal coupler 11 is proximate to the pin end 12 of the component 13, and the transceiver portion 160 may be in a shoulder 19 of the component 13. The signal coupler 11 may be selected from the group consisting of inductive couplers, direct-contact couplers, and combinations thereof. In the preferred embodiment, the signal coupler is an inductive coupler comprising a coil of wire disposed in a trough of magnetically conducting material. A more detailed description of an inductive coupler that may be used with the present invention will be given in connection with FIG. 4 and FIG. 5.

Still referring to FIG. 1, in this embodiment an electrical coil 20 is wrapped around at least part of the conductor portion 37 of the signal coupler 11. The electrical coil 20 comprises one or more turns of wire 15. The electrical coil 20 may be disposed in a magnetically conductive material 16 such as ferrite, nickel, iron or combinations thereof. A more detailed description of possible embodiments of the electrical coil 20 will be given in connection with FIGS. 6a-d.

Still referring to FIG. 1, a peripheral electronic device 17 associated with the downhole component 13 is in communication with the electrical coil 20. Preferably the peripheral electronic device 17 is in electrical communication with the electrical coil through electrical conductor 18, as shown. The peripheral electronic device 17 is in communication with the data conductor through the electrical coil 20. The electronic device 17 may be selected from the group consisting of integrated circuits, pressure sensors, temperature sensors, torque sensors, gyroscopes, inclinometers, accelerometers, chemical sensors, vibration sensors, downhole tools, and combinations thereof. The electronic device 17 may be located in the wall of the downhole component 13, in the bore of the downhole component 13, affixed to the outside of the downhole component 13, or in other locations in the downhole component 13. The electronic device 17 may be adapted to receive signals from and/or transmit signals to the conductor portion 37 of the signal coupler 11. The signals may be power signals, data signals, packets, or combinations thereof.

Figure 2:
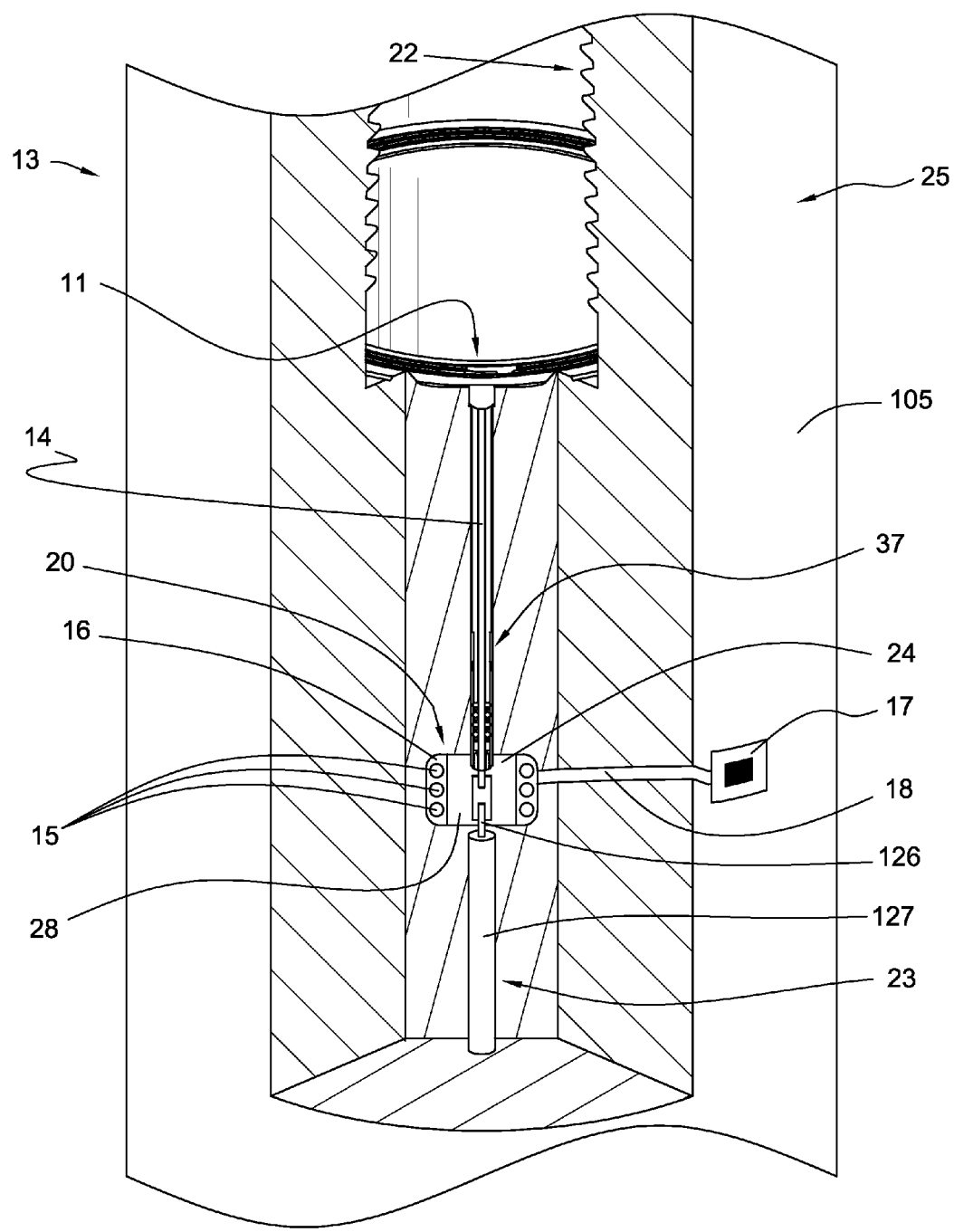
FIG. 2 is a cut-away diagram of a box end of a downhole component.

Referring now to FIG. 2 a signal coupler 11 may also be in a box end 22 of a downhole tubular component 13. Electrical coil 20 may surround the junction 24 between lead-in 14 of the conductor portion 37 of the signal coupler 11 and the data conductor 23. The data conductor 23 may be a coaxial cable with inner 126 and outer 127 conductors. The peripheral electronic device 17 may be located in the wall 105 of the downhole component 13 and electrical conductor 18 may connect the peripheral electronic device 17 to the electrical coil 20. As previously discussed, electrical coil 20 may comprise at least one turn of wire 15, and may be disposed in a magnetically conducting material 16. A dielectric material 28 such as plastic, epoxy, Teflon® or PEEK® may also be disposed between the junction 24 and the magnetically conducting material 16 to electrically insulate the electrical coil 20 from the junction 24.

Figure 3:
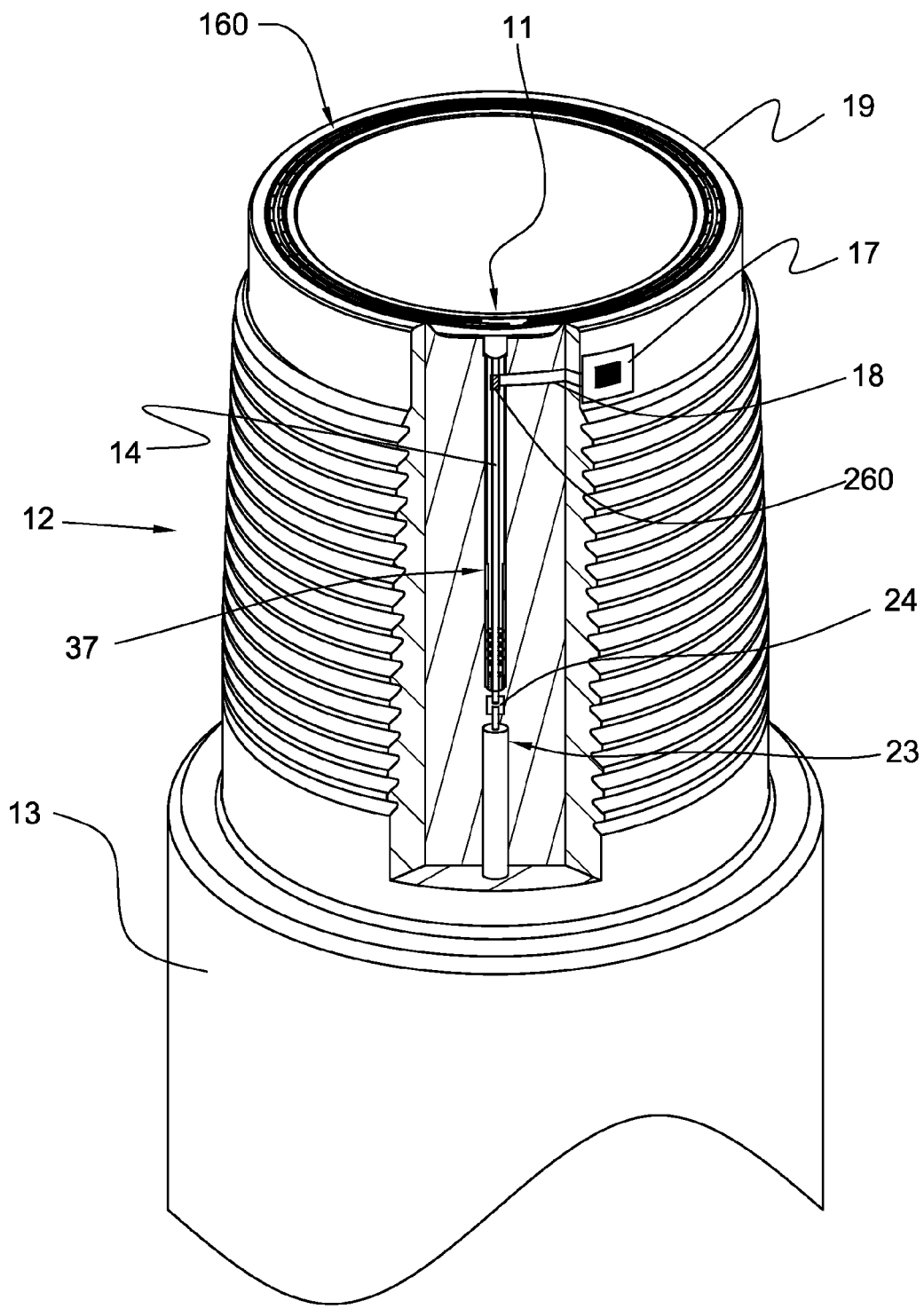
FIG. 3 is a cut-away diagram of a pin end of a downhole component.

Referring now to FIG. 3, in other embodiments of the invention a peripheral electronic device 17 may be in communication with the conductor portion 37 of the signal coupler 11 through direct electrical contact. An interface 260 may provide the electrical contact by attaching to both the conductor portion 37 of the signal coupler 11 and electrical conductor 18 from the electronic device 17. One advantage of such a configuration is less attenuation in a signal transferred from the electronic device 17 to the conductor portion 37 or vice versa than the attenuation in a similar signal transfer using the embodiment of FIGS. 1-2.

Figure 4:
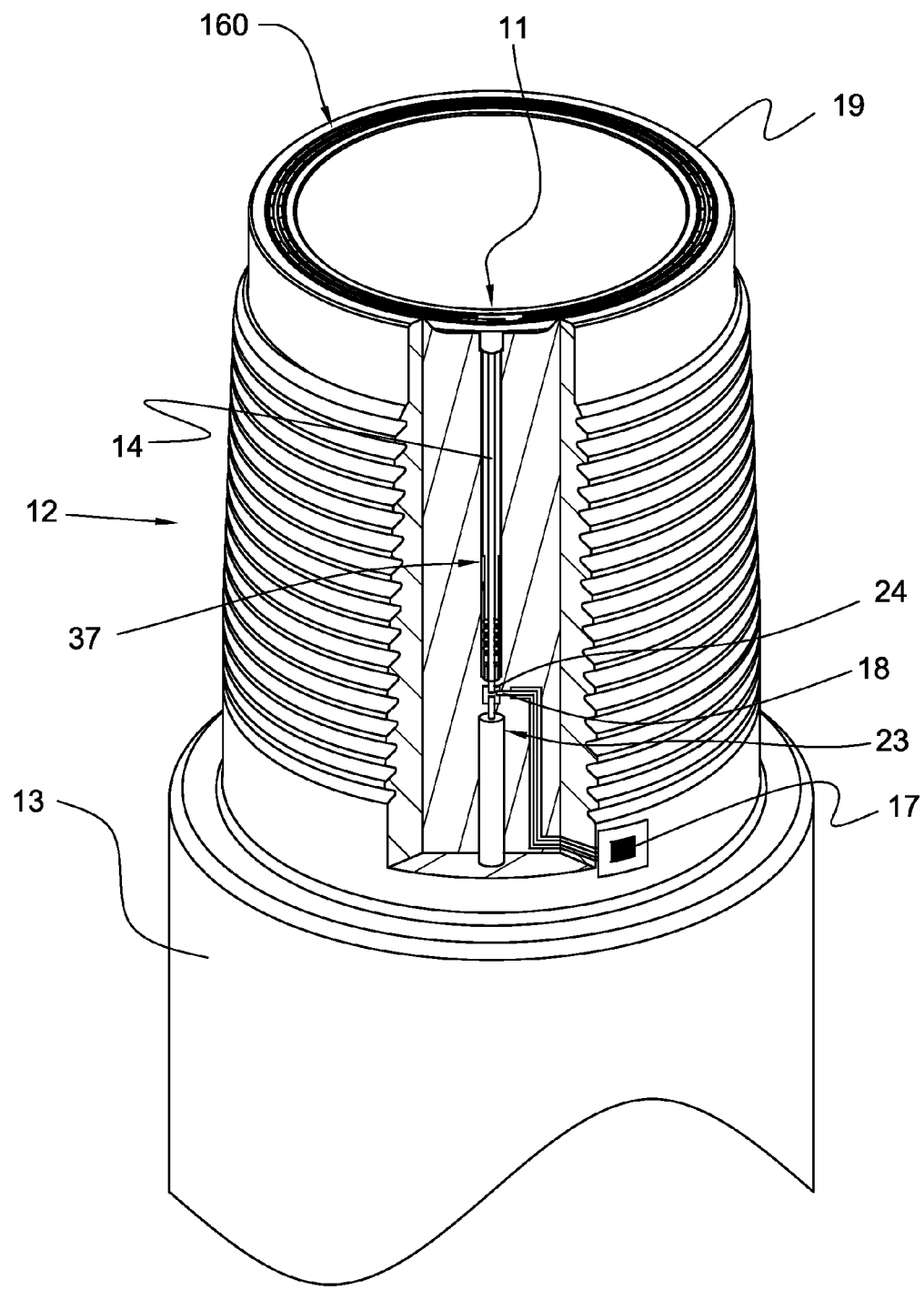
FIG. 4 is a cut-away diagram of a pin end of a downhole component.

Referring now to FIG. 4, in other embodiments of the invention the electronic device 17 may achieve direct electrical communication with the conductor portion 37 of the signal coupler 11 by coupling to the junction 24 between the conductor portion 37 and the data conductor 23.

Figure 5:
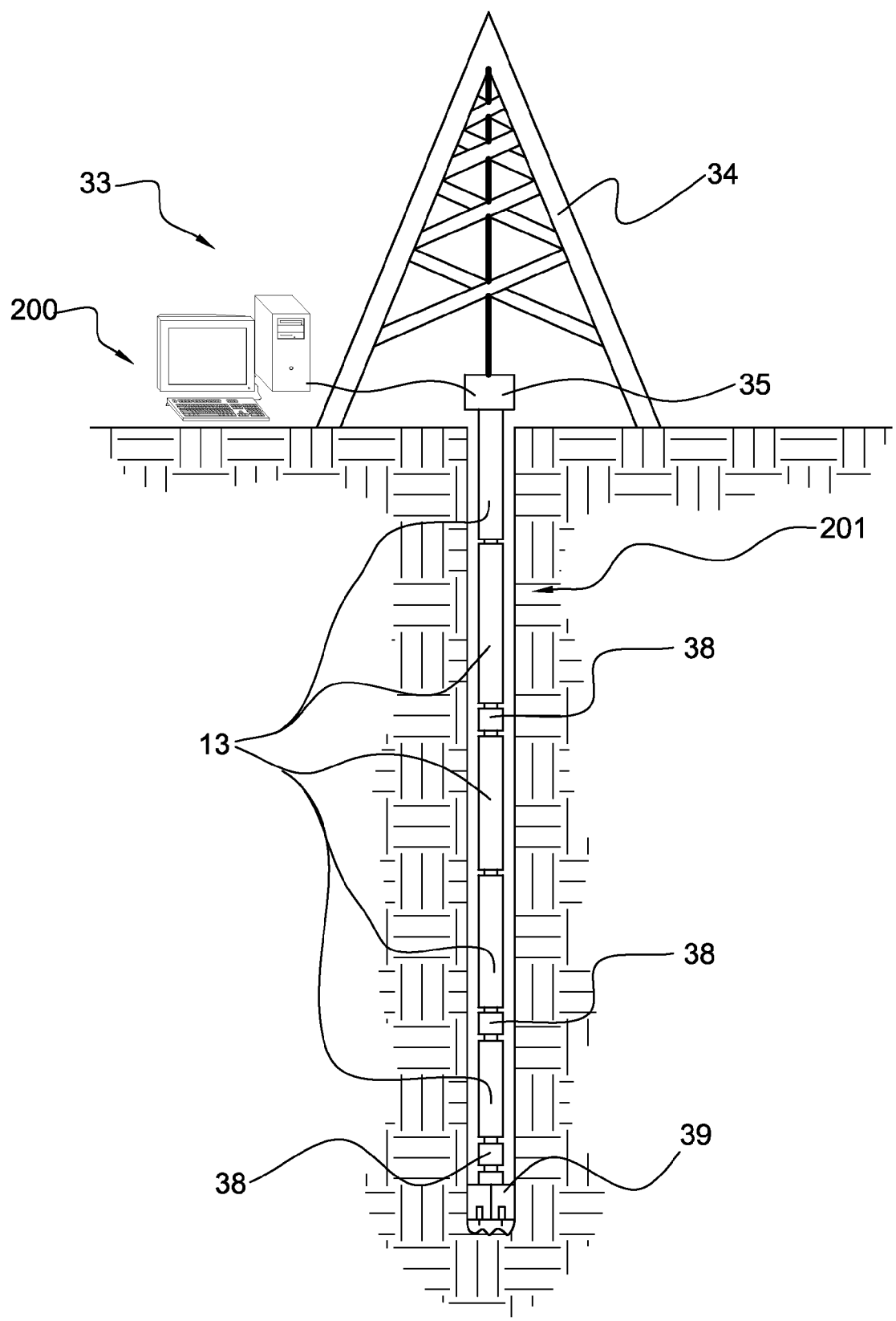
FIG. 5 is a diagram of a downhole network.

FIG. 5 is a diagram of a downhole network 33 in a downhole tool string 201 which may be used with the present invention. A downhole network 33 may be used in oil production, geothermal exploration, or oil and gas drilling. The network 33 comprises various downhole tubular components 13 such as those illustrated in FIGS. 1-4, with each tubular component 13 comprising an integrated data conductor 23 and at least one signal coupler 11 in communication with the data conductor 23 and disposed in an end 12, 22 of the tubular component 13.

In-line tubular network nodes 38 may be located at various locations along the length of the tool string 201 and operably interconnected by one or many lengths of tubular components 13 linked together. In-line network nodes 38 may be positioned near a drill bit 39 or a bottom hole assembly, so that drilling parameters and monitoring feedback may be accessible to workers on the surface in real time. Distributed in-line network nodes 38 along the length of the tool string 201 may also be beneficial to allow the collection and conveyance to the surface of data from different depths of a bore. A preferred embodiment of the in-line network nodes 38 is disclosed in U.S. patent application Ser. No. 10/613,549 entitled "Link Module for a Downhole Network," which is herein incorporated by reference.

Preferably the in-line network nodes 38 are a type of tubular component 23 and comprise signal couplers 11 that mate to the signal couplers 11 in other tubular components 23 to which they link. The in-line network nodes 38 may transmit information up and/or down the tool string 201 through the tubular components 23 and other in-line network nodes 38. A governing protocol may control the format in which this information is transmitted in addition to media access by the in-line network nodes 38.

In the preferred embodiment of the invention, the downhole network also comprises plurality of peripheral electronic devices 17, each peripheral device 17 being in communication with the conductor portion 37 of a signal coupler 11 disposed in the end of a tubular component 37. These peripheral electronic devices 17 have been described in more detail previously (see FIGS. 1-4) and may interface with the conductor portion 37 of the signal coupler 11 through an inductive electrical coil 20 wrapped around the conductor portion 37 or through a direct electrical connection to a junction 24 of the data conductor 23 and the conductor portion 37. In alternate embodiments, the downhole network 33 may only comprise a plurality of peripheral electronic devices 17 in communication with the downhole data transmission system.

Figure 6:
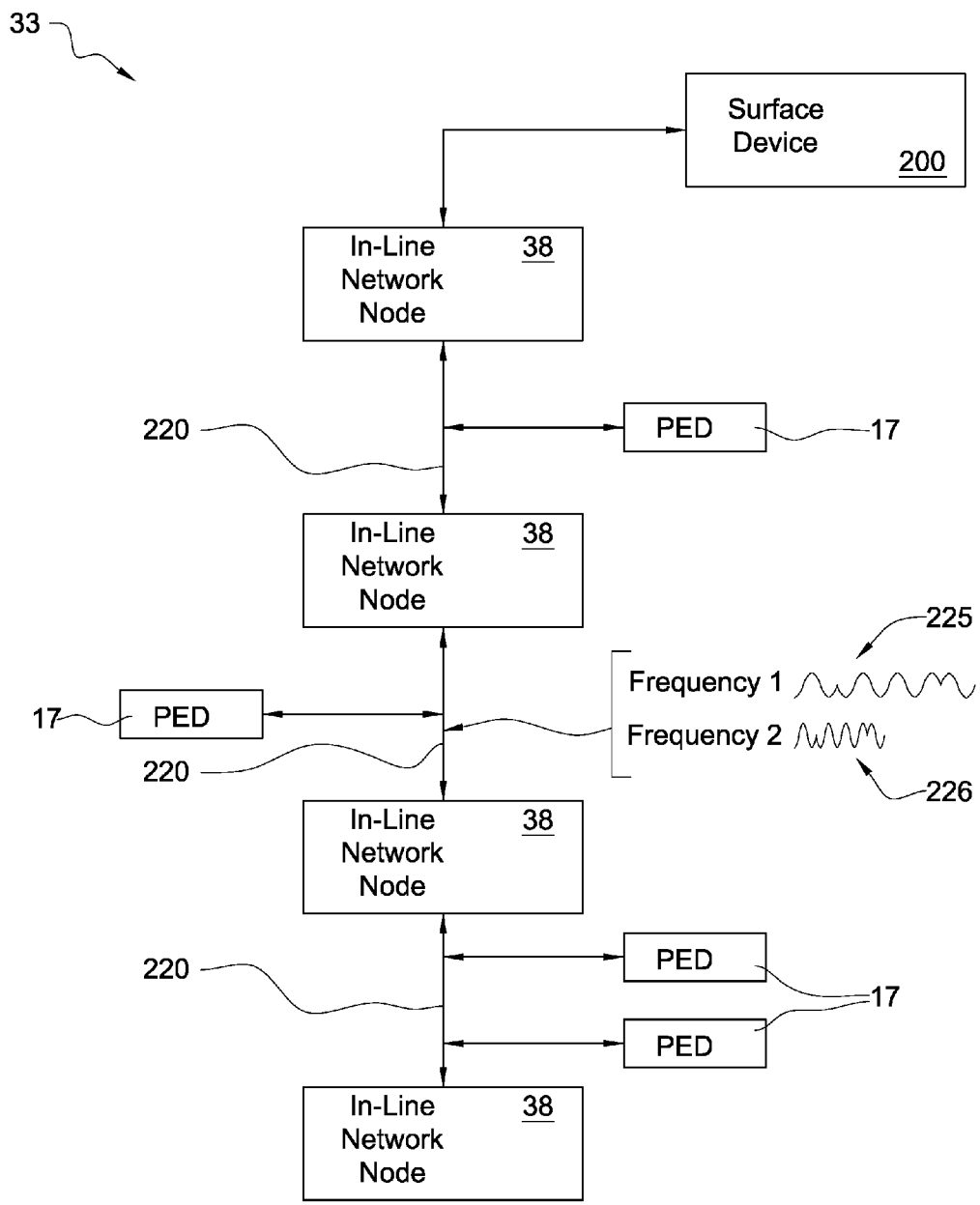
FIG. 6 is an electronic schematic of a downhole network.

Referring now to FIG. 6, the in-line network nodes 38 are different from the peripheral electronic devices 17 in both their physical configuration with respect to the downhole network 33 and the way they transmit data on the network 33. Physically, the in-line network nodes 38 are essential elements in the path 220 of data transmission along the network 33 and may play an active part in amplifying network data signals they receive and transmitting new data onto the network 33. Parenthetically, it is important to understand that the path 220 of data transmission may be physically implemented by a plurality of tubular components 17. Consequently, more than one peripheral. In contrast, the peripheral electronic devices 17 may be characterized as parallel devices in that they are not directly in the path of data transmission between in-line network nodes 38.

In some embodiments, the peripheral electronic devices 17 may be addressable on the downhole network 33 and transmit information according to the specified protocol of the network 33. In other more preferred embodiments, the peripheral electronic devices 17 may utilize the downhole data transmission system of in-line network nodes 38, data conductors 23, and signal couplers 11 to transmit data to surface equipment 200 while remaining transparent to the in-line network nodes 38. One method of accomplishing this entails the modulation of data by the peripheral electronic devices 17 onto a carrier frequency that is separate and distinct from the carrier frequency used by the in-line network nodes 38.

Such a system may be advantageous in situations where a peripheral electronic device 17 such as a sensor may comprise the ability to communicate with the surface equipment 200 with a few simple codes. For example, a pressure sensor in communication with the conductive medium 37 may transmit a single pulse onto the transmission path if there is some increase in the downhole pressure. Such a single pulse may help workers adjust parameters in under balanced drilling operations. Two pulses from the pressure sensor may indicate that the downhole pressure has increased to a level such that a surface crew's safety is in danger and blow-out preventors may automatically respond. Three pulses may indicate a decrease in pressure and indicate if drilling mud is being lost into a subterranean formation. A similar system may be desirable to indicate when a battery supplying power to downhole equipment is low. In other embodiments, more efficient and/or reliable modulation techniques may be used to send signals to the surface.

This type of system may be preferable for communicating sudden changes in downhole parameters and for important messages, such as those dealing with safety parameters, in a manner that may avoid transmission delays by avoiding standard network protocols. One way to avoid the standard protocol of the network 33 is to transmit the signal on a separate frequency from the frequency on which other network signals are transmitted. For example, this figure shows samples of two signals 225, 226 that are being transmitted along the network path 220.

For convenience in comparing the signals 225, 226, both signals 225, 226 are shown to be modulated by dual phase quadrature keying (DPSK), but any modulation scheme may be used according to the needs of specific implementations of the invention. Signal 225 may represent data being transmitted between in-line network nodes 38 and is modulated on a different carrier frequency than that of signal 226, which may represent data transmitted by the peripheral electronic devices 17. Preferably the in-line nodes 38 amplify signals transmitted at all frequencies throughout the downhole data transmission system.

This embodiment would allow transmissions from the electronic devices 17 to be received and interpreted at the surface independent of other network signals. In an embodiment of the invention where multiple electronic devices 17 are transmitting simple signals on the same channel, it may be desirable that they use a media access protocol to avoid communication problems.

In some embodiments of the present invention, a signal may be sent to the electronic device 17 from the surface or from other downhole tools. For example, in order to save power, the electric device 17 may comprise several power consumption states, one of which being a sleep mode. The electronic device 17 may be in a sleep mode until it receives a predetermined "wakeup" signal 17. This may be desirable in situations where drilling or oil production has stopped for a period of time. Also some devices 17 may not be as useful in drilling until the devices 17 have advanced to a certain depth in the well bore, and may be woken upon reaching a desired depth.

Figure 7:
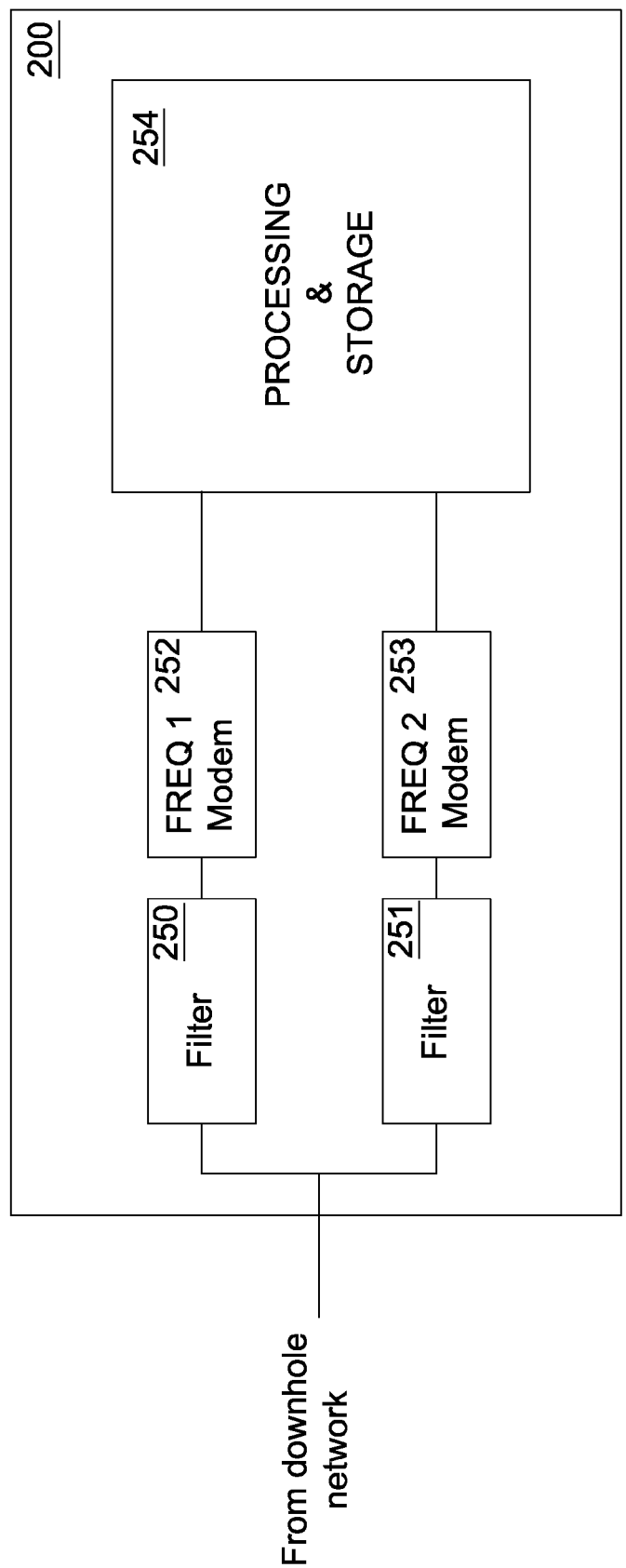
FIG. 7 is a diagram of a possible embodiment of surface equipment in a downhole network.

Referring now to FIG. 7, a schematic diagram of one embodiment of surface equipment 200 in the downhole network 33 is shown. The surface equipment 200 may be connected to the downhole network 33 and receive from it an analog signal which is in turn passed through filters 250, 251 to recover signal 225 transmitted from the network of in-line network nodes 38 and the signal 226 from the peripheral electronic device(s) 117, respectively. The recovered signals 225, 226 may then be passed through respective modems 252, 253 to recover the digital signal or packet transmitted. Once the digital signal or packet is recovered, it is forwarded to the processing & storage module 254 which may then process and/or store the signal or packet according to design.

Figure 8:
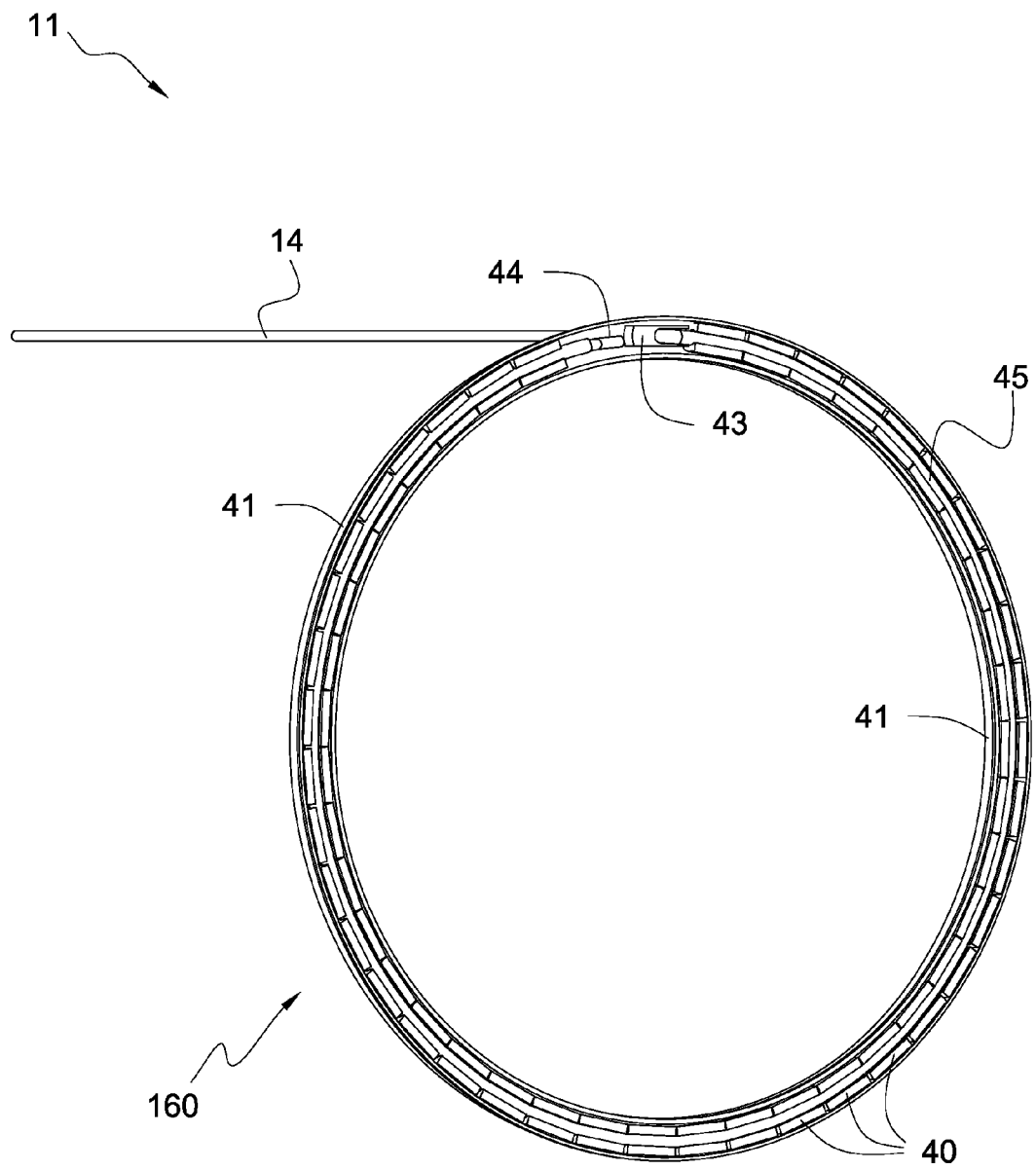
FIG. 8 is a perspective diagram of an inductive coupler.

FIG. 8 is a detailed diagram of a signal coupler 11. The transceiver portion 160 comprises a wire coil 45 in a trough of magnetically conducting material 40. A metal ring 41 surrounds the trough of magnetically conducting material 40 and one end of the coil 45 has a welded connection 44 to the ring 41. A second end of the coil 45 passes through a hole 43 and forms a lead-in 14 in the conductor portion 11 of the signal coupler 11 which may be connected to other wires or cables.

Figure 9:
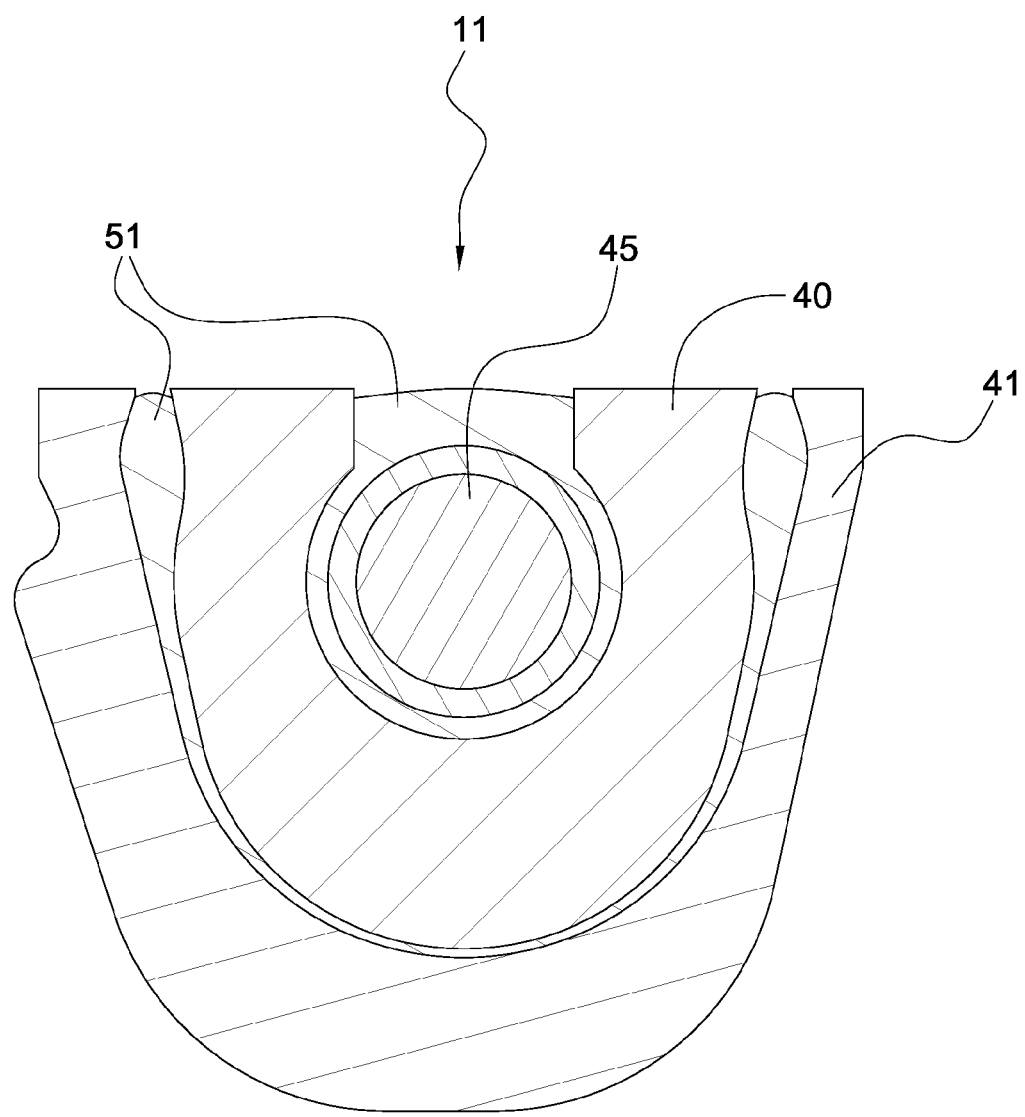
FIG. 9 is a cross-sectional diagram of an inductive coupler.

FIG. 9 is a cross-sectional diagram of a signal coupler 11 showing wire 45 in a trough of magnetically conducting material 40 and a metal ring 41 surrounding the trough 40. The magnetically conducting material 40 is preferably also an electrically insulating material such as a ferrite. Alternatively, an electrically insulating layer 51 may be disposed between the ring 41 and the magnetically conducting material 40 and/or between the magnetically conducting material 40 and wire 45.

Figure 10A:
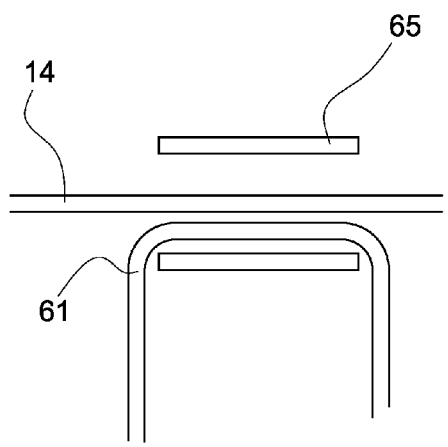
FIG. 10a-d are diagrams of several embodiments of electrical coils.

FIGS. 10a-d are cross-sectional diagrams of several embodiments of ways to achieve communication between the peripheral electronic device 17 and the lead-in 14 of the conductor portion 37 of the signal coupler 11 as previously discussed in connection with FIGS. 1-2. FIG. 10a shows a wire 61 running adjacent to lead-in 14. Wire 61 is preferably proximate to the lead-in 14 such that current flowing in wire 61 will induce a current in the lead-in 14 and vice versa.

Figure 10B:
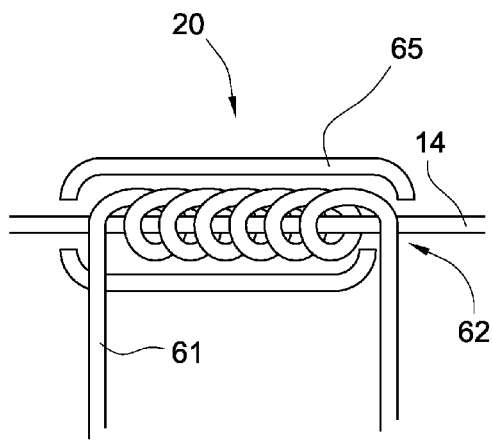
Figure 10C:
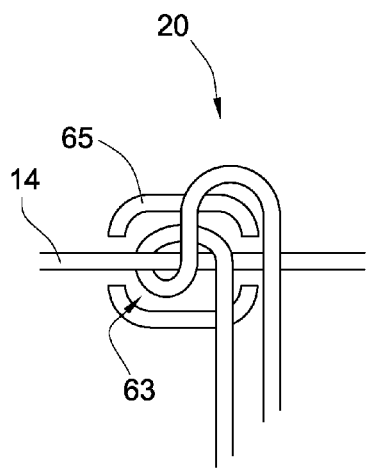
Figure 10D:
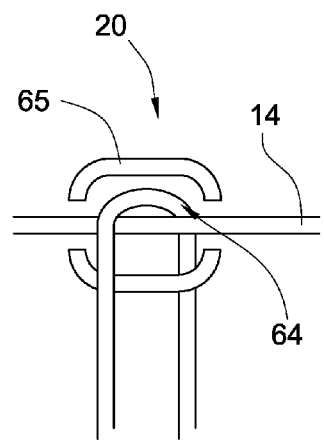

FIG. 10b shows a preferred electrical coil 20 wherein multiple turns 62 of wire 61 surround lead-in 14. The electrical coil 20 may be surrounded by magnetically conducting material 65. Alternatively, only one turn 63 may surround the lead-in 14 as seen in FIG. 10c or a partial turn 64 may partially surround the lead-in 14 as seen in FIG. 10d. Generally, multiple turns 62 allow more efficient communication between the electrical coil 20 and the data conductor 23. Although FIGS. 10a-d all show a magnetically conductive material in conjunction with wire 61, it is believed that the magnetically conductive material 65 is not requisite to make an electromagnetic connection with wire 22.

Figure 11A:
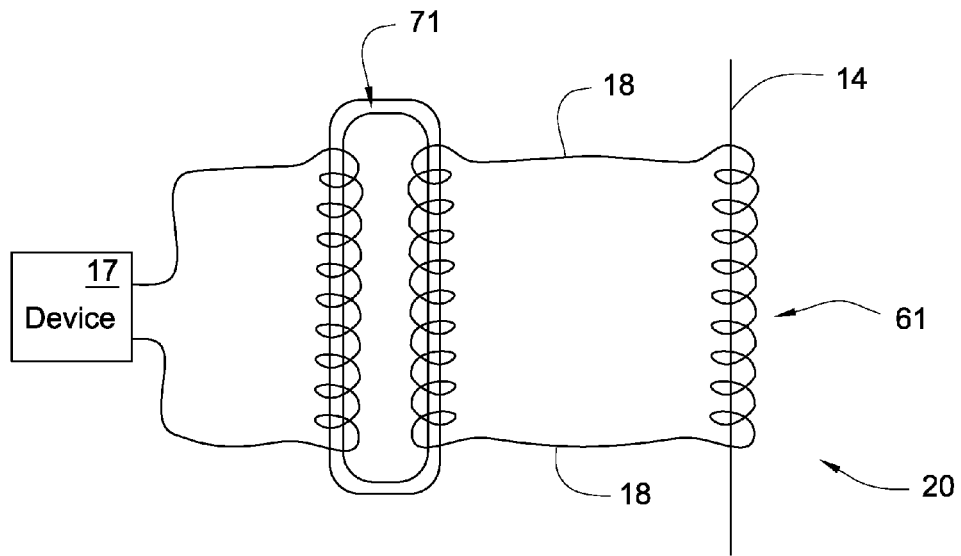
FIG. 11a is a diagram of an embodiment of a connection to an electrical coil.
Figure 11B:
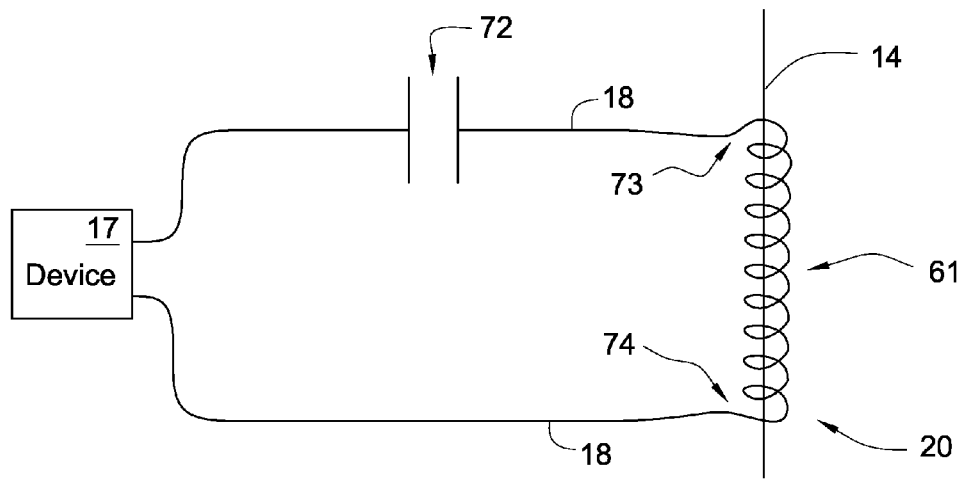
FIG. 11b is a diagram of an alternative embodiment of a connection to an electrical coil.

FIG. 11a and FIG. 11b are diagrams of two embodiments of an electromagnetic connection between a peripheral electronic device 17 and an electrical coil 20. In FIG. 11a, wire 61 surrounds lead-in 14 and is connected by direct electrical connections 18 to one half of a transformer 71. The other half of transformer may be connected to the peripheral electronic device 17, thus placing the peripheral electronic device 17 in communication with the electrical coil 20.

In FIG. 11b, wire 61 surrounds lead-in 14, and one end 73 of electrical coil 20 is connected by a direct electrical connection 18 to a capacitor 72. The capacitor may be connected to electrical device 17 (not shown) and a second end 74 of electrical coil 20 may be connected by a direct electrical connection 18 to the electrical device 17. The electrical device 17 may therefore be in electromagnetic communication with electrical 20.

The transformer 71 in FIG. 11a and/or the capacitor 72 in FIG. 11b may be used to match the impedance of the electrical coil 20 to the impedance of the peripheral electronic device 17 (see FIG. 1). Alternatively, the peripheral electronic device 17 may be directly connected to both ends of the electrical coil 20 as in FIG. 11c.

Figure 12A:
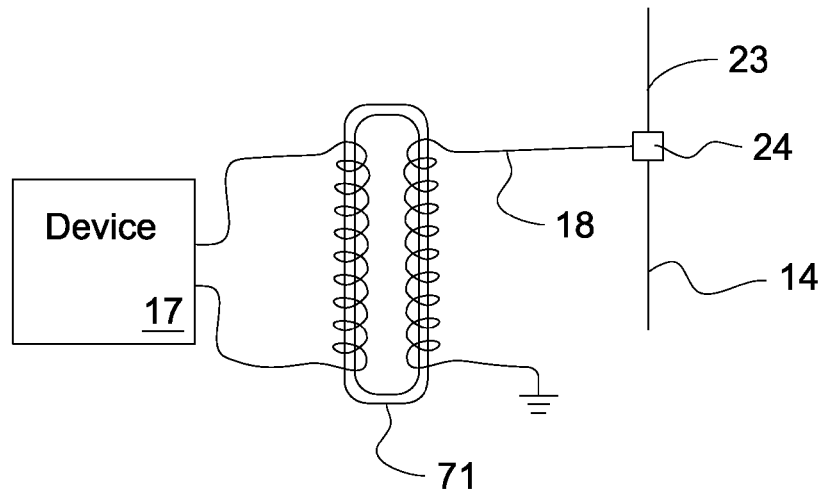
FIGS. 12a-c are diagrams of embodiments of connections between a junction interface and a peripheral electronic device.

Referring now to FIG. 12a, in some embodiments the electronic device 17 may be in communication with the junction 24 of the data conductor 23 and the lead-in 14 of the conductor portion 37 of the signal coupler 11 through a transformer 71. An electrical conductor 18 may be connected to one half of the transformer 71 and carry an electrical signal from the junction 24, in turn inducing a similar electrical signal in the other half of the transformer 71 which may be connected to the peripheral electronic device 17.

Figure 12B:
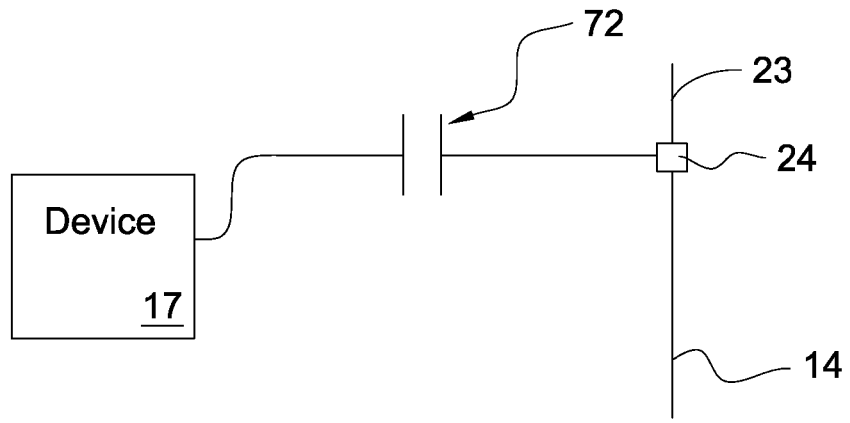
Figure 12C:

In other embodiments, the peripheral electronic device 17 may be in communication with the data conductor 23 and the lead-in 14 of the conductor portion 37 of the signal coupler 11 through a capacitor 72 (as shown in FIG. 12b), or direct electrical contact (as shown in FIG. 12c).

Whereas the present invention has been described in particular relation to the drawings attached hereto, it should be understood that other and further modifications apart from those shown or suggested herein, may be made within the scope and spirit of the present invention.

What is claimed is:

1. A downhole communication apparatus comprising:
   a signal coupler proximate an end of a downhole tubular component, the signal coupler comprising a transceiver portion and a conductor portion;
   a data conductor integrated into the downhole tubular component and electrically connected at a junction interface to the conductor portion of the signal coupler; and
   a peripheral electronic device in communication with the junction interface;
   wherein the peripheral electronic device is in communication with the data conductor through the junction interface;
   wherein the junction interface is an inductive interface.

2. The apparatus of claim 1 wherein the data conductor is selected from the group consisting of wires, coaxial cables, triaxial cables and combinations thereof.

3. The apparatus of claim 1 wherein the peripheral electronic device comprises at least one device selected from the group consisting of integrated circuits, pressure sensors, temperature sensors, actuators, piezoelectric devices, torque sensors, gyroscopes, inclinometers, accelerometers, chemical sensors, vibration sensors, processing elements and combinations thereof.

4. The apparatus of claim 1 wherein the peripheral electronic device is located in the wall of the downhole component, in the bore of the downhole component, affixed to the outside of the downhole component, or combinations thereof.

5. The apparatus of claim 1 wherein the downhole component is part of a downhole tool string.

6. The apparatus of claim 5, wherein data is transmitted through the downhole tool string by a system of data conductors and signal couplers in the downhole tool string.

7. The apparatus of claim 6 wherein the peripheral electronic device is adapted to transmit information on the downhole tool string.

8. The apparatus of claim 6, wherein the peripheral electronic device transmits data at a carrier frequency distinct from a carrier frequency of separate data transmissions on the tool string.

9. The apparatus of claim 1, wherein the junction interface comprises a direct electrical connection to the data conductor, the peripheral electronic device, and the conductor portion of the signal coupler.

10. The apparatus of claim 1, wherein the inductive interface comprise an electrical coil electrically isolated from the conductor portion of the signal coupler.

11. The apparatus of claim 10, wherein the electrical coil comprises at least one turn of wire around the conductor portion of the signal coupler.

12. The apparatus of claim 10, wherein the electrical coil is disposed in a magnetically conductive material.

13. The apparatus of claim 10, further comprising a dielectric material intermediate the electrical coil and the conductor portion of the signal coupler.

14. The apparatus of claim 1, wherein the junction interface is located on a lead-in of the conductor portion of the signal coupler.

15. The apparatus of claim 1, wherein the junction interface is located on a capacitor of the conductor portion of the signal coupler.

* * * * *